US000001322H

United States Statutory Invention Registration [19]

[11] Reg. Number: H1322

Moore et al.

[43] Published: Jun. 7, 1994

[54] METHOD FOR MANUFACTURING DEXTROSE GRAINED CONFECTIONS

[75] Inventors: Carl O. Moore, Rochester; James R. Dial, Moweaqua; Loretta A. Heagy, Decatur, all of Ill.

[73] Assignee: A. E. Staley Manufacturing Company, Decatur, Ill.

[21] Appl. No.: 818,657

[22] Filed: Jan. 8, 1992

[51] Int. Cl.[5] ..... A23G 3/00

[52] U.S. Cl. ..... 426/572; 426/660

*Primary Examiner*—Donald P. Walsh
*Assistant Examiner*—Daniel Jenkins

[57] ABSTRACT

A method of manufacturing dextrose grained confections is provided. The confections are prepared from a high solids syrup comprised of dextrose and fructose, said syrup being supersaturated with respect to dextrose. The method comprises seeding said syrup with dextrose seed crystals and allowing dextrose to crystallize from said syrup onto said dextrose seed crystals to produce a dispersion of dextrose microcrystals dispersed in the liquid phase of said syrup. The resulting dispersion of microcrystals is incorporated into a comestible article in which moisture transfer from the dispersion to the surrounding environment is limited. The comestible article is stable upon storage because the amount of fructose in said syrup is insufficient to prohibit the formation of said microcrystals of dextrose, but is sufficient to maintain the stability of said liquid phase during said storing.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MANUFACTURING DEXTROSE GRAINED CONFECTIONS

FIELD OF THE INVENTION

This invention relates to a method useful in the manufacture of confections having a grained texture and which are derived from saccharide syrups, particularly fondants and nougats.

BACKGROUND OF THE INVENTION

Processes and recipes for various confections, including fondants, cremes and the like, are disclosed and discussed by B. W. Minifie, *Chocolate, Cocoa and Confectionery: Science and Technology,* pp. 390–402, 424–425, and 481–483 (AVI Publ. Co., Westport Conn., 1980, 2d ed.). The use of sucrose along with dextrose (e.g. corn syrup) in making fondant and in remelting fondant in the making of a creme is disclosed. Specific recipes disclose the use of corn syrup having sucrose dissolved therein which are concentrated to supersaturate with respect to sucrose. The supersaturated syrup is then beaten to induce crystallization of the sucrose. It is also disclosed that glucose is included in the frappes that are usually incorporated in the fondant to form a creme. The use of high fructose corn syrup or fructose in sugar confectionery in general is also disclosed by Minifie at pp. 481–482.

British Patent No. 1,236,895 (Rostagno) discloses the preparation of fondants containing dextrose in which a hot aqueous solution of dextrose and at least one sugar other than dextrose is cooled to crystallize dextrose therefrom. The patent discloses that crystallization may be induced by adding hydrated dextrose crystals.

SUMMARY OF THE INVENTION

This invention relates to a method of preparing a dextrose grained nougat confection comprising:

preparing a mixture comprised of a sweetener syrup and a proteinaceous whipping agent, said sweetener syrup comprising dextrose and fructose and being supersaturated with respect to dextrose, but containing sufficient water to dissolve said whipping agent;

aerating the sweetener syrup of said mixture to disperse therein a discontinuous gas phase contained within a continuous aqueous liquid phase;

seeding said sweetener syrup with dextrose seed crystals and allowing dextrose to crystallize from said sweetener syrup onto said dextrose seed crystals to produce a dispersion of dextrose microcrystals dispersed in said aqueous liquid phase of said sweetener syrup;

incorporating said mixture after said aerating and seeding into a comestible article and storing said comestible article, wherein the amount of fructose in said sweetener syrup is insufficient to prohibit the formation of said microcrystals of dextrose, but is sufficient to maintain the stability of said aqueous liquid phase during said storing.

It has been found that a dextrose grained nougat confection having excellent organoleptic properties can be produced by seeding an aerated sweetener syrup containing dextrose and fructose with dextrose seed crystals. The fructose in the syrup is insufficient, in relation to the dextrose content and moisture content, to prohibit formation of dextrose microcrystals, but is sufficient to maintain a stable liquid phase upon storage of the confection.

DETAILED DESCRIPTION OF THE INVENTION

The first step in preparing a dextrose grained confection of this invention is obtaining a high solids sweetener syrup comprised of dextrose and fructose. The dextrose and fructose can be derived from a variety of sources.

Dextrose is available commercially in the anhydrous or monohydrate crystalline form, or as a syrup, including syrups containing a mixture of dextrose and another material, e.g. high fructose corn syrup and 64 D.E. corn syrup. Dextrose is generally obtained by the hydrolysis of starch, e.g. from corn. The production and properties of dextrose and corn syrups are discussed by H. M. Pancoast et al., *Handbook of Sugars,* pp. 157–287 (AVI Publ. Co., Westport, Conn., 2d ed., 1980), the disclosure of which is incorporated by reference herein. Substantially pure dextrose, as crystalline monohydrate or high solids syrup (e.g. about 70% by weight) are preferred for use herein. Corn syrups are characterized by dextrose equivalent (D.E.) with the high conversion syrups having a high D.E. and a high concentration of dextrose. Lower conversion syrups may be useful, but are not preferred. Corn syrups are typically an inexpensive source of dextrose and thus may be a preferred source of dextrose for this reason.

The fructose may be derived from crystalline fructose, a high fructose corn syrup, or an invert syrup. Crystalline fructose is also an item of commerce, but has historically been much less plentiful than dextrose and corn syrups. The crystallization of fructose is disclosed in U.S. Pat. Nos. 3,883,365 (Forsberg et al. ), 3,928,062 (Yamauchi), 4,199,374 (Dwivedi et al. ), and 4,643,773 (Day). Crystalline fructose is distinguished from materials containing significant amounts of amorphous fructose or corn syrup by-products, e.g., the semi-crystalline fructose disclosed in U.S. Pat. No. 4,517,021 (Schollmeier) Crystalline fructose is available commercially at a purity in excess of 99.0% as the anhydrous crystalline form of beta-D-fructose, for example KRYSTAR ® brand crystalline fructose available from A. E. Staley Manufacturing Company, Decatur, Ill.

The fructose may also be obtained by the use of high fructose corn syrup or an invert syrup. By "high fructose corn syrup" (HFCS) is meant a corn syrup containing at least about 40% fructose by weight of dry solids (d.s.), typically from about 40% to about 60% (e.g., the two most common HFCS are at a nominal 42% or 55% d.s. fructose). High fructose corn syrups are items of commerce as disclosed by H. M. Pancoast et al., *Handbook of Sugars,* pp. 176–177 and 232–233. The Type A high fructose corn syrup referred to therein and having 42% d.s. fructose is the product of enzymatic isomerization of a glucose syrup that generally has from 5–8% higher saccharities (e.g. di-saccharides, tri-saccharides, and so on). The Type B high fructose syrup contains 55% d.s. fructose and is typically obtained by chromatographic fractionation of a Type A syrup, but can be obtained by other means of fructose enrichment of a Type A syrup (e.g. crystallization of dextrose from a Type A syrup). Invert syrup is obtained by the "inversion", i.e. hydrolysis, of sucrose.

The dextrose and fructose are used to prepare a sweetener syrup that is supersaturated with respect to dextrose. The water used to prepare the syrup can be from any potable source or can be supplied by one of the sweetener syrups described above. Dry or liquid sweeteners can be combined in any order. Crystalline fructose and crystalline dextrose can be mixed with a syrup separately or premixed together before mixing with the syrup. The precise ratio of dextrose to fructose may vary widely depending upon the precise characteristics desired in the resulting product, but there will generally be a major amount by weight (e.g. more than 50% d.s.b.) of dextrose and a minor amount by weight (e.g. less than 50% by weight d.s.b. ) of fructose, e.g. a ratio of dextrose to fructose of from about 1.5:1 to about 2.5:1. The precise amount of water in the syrup will depend upon the ratio of dextrose to fructose and the texture desired of the resulting fondant, but will generally range from about 10% to about 20% by weight. If processing of the syrup will involve vaporization of a significant amount of the water, such vaporization should be taken into account in choosing the initial water content of the syrup.

Prior to incorporation of the resulting confectionary dispersion into a comestible product, and preferably prior to seeding with dextrose crystals, the dispersion may be mixed with a variety of functional ingredients. Such functional ingredients include flavors and colors of choice. In the case of a nougat, the dispersion will be mixed with a proteinaceous whipping agent, such as a milk or egg protein or, preferably, a soy protein isolate, and then aerated. A suitable soy protein isolate is VER-SA-WHIP ® brand whipping protein from A. E. Staley Manufacturing Company, Decatur, Ill. A nougat will also typically contain a fat component comprised of a fat and/or oil, e.g. a partially hydrogenated vegetable oil, in a minor amount, typically from about 5% to 10% by weight of the composition. Typical fats and oils consist essentially of fatty acid triglycerides as discussed by T. H. Applewhite, "Fats and Fatty Oils", *Encyclopedia of Chemical Technology,* Vol. 9, pp. 795–831 (Kirk-Othmer, eds., John Wiley & Sons, Inc., N.Y., N.Y., 3rd ed., 1980), the disclosure of which is incorporated herein by reference.

The aeration of the mixture suspends a gas, typically air, in the mixture to yield a texture characteristic of nougat. The degree of aeration will depend upon the texture desired of the resulting confection, but will typically range from about 0.2 to about 1.0 g/cc. A nougat for a biscuit cookie filling will typically have a density of about 0.55 to 0.6 and for a nougat deposited in a chocolate shell, a density of about 0.7 to 0.75. Aeration can be accomplished by a variety of methods, as discussed by Minifie, *Chocolate, Cocoa and Confectionery,* above, at pp. 474–476, the disclosure of which is incorporated herein by reference. Suitable methods of aeration include mechanical aeration either with a planetary beater at atmospheric pressure or by injection of pressurized air into a continuous pressure whisk.

The dispersion may also contain a starch to provide thickening or a set to the dispersion. Any type of starch capable of thickening or setting, as desired, is acceptable, but thin-boiling common starches are preferred. Common starches are known in the art to be conventional genetic varieties as opposed to unconventional genetic varieties having unconventional traits, e.g. waxy corn starch (essentially amylopectin) and high amylose corn starch. An especially preferred starch is SOFT-SET ® corn starch, a commercial product of the A. E. Staley Manufacturing Company. Other suitable starches include unmodified (i.e. no chemical modification) and modified (e.g. substituted, crosslinked, thin-boiling, and oxidized) common tapioca and common potato starches.

The starch of the mixture is gelatinized generally by cooking. Preferred mixtures contain "cook-up" starches which are gelatinized during a cooking period after mixing with the sweetener system. A preferred cook-up starch is MIRA-SET ® 285, a commercial product of A. E. Staley Manufacturing Company, Cooking under atmospheric pressure in a heated vessel will simultaneously fully hydrate the starch and remove excess moisture. Pressure cooking can also be used, particularly when it is desired to minimize water loss from the mixture and reduce evaporation costs.

The supersaturated syrup is seeded with dextrose crystals to initiate the crystallization of dextrose and thus form microcrystals of dextrose dispersed in a liquid phase. The precise particle size of the dextrose seed will vary depending upon the texture desired in the resulting confection, but will generally range from about 50 to about 100 micrometers. The seeding will be accomplished by mixing the seed with the syrup by means which obtain a substantially homogeneous dispersion of the dextrose seed throughout the syrup.

After seeding and incorporation of any functional ingredients, the dispersion is ready for incorporation into a comestible product. The dispersion can be deposited into a plurality of molds where it is allowed to firm or set. In molding, the bulk mixture, still in a flowable state, is divided among a number of molds. The molds can be of any construction suitable for the intended purpose. Starch molds can be employed. Starch molds are formed by making a plurality of depressions of the desired shape in a bed of starch.

The dispersion can be directly incorporated into a food product. It can be used as the filling for a sandwich type cookie or deposited on a cookie base which is then coated or enrobed with chocolate or icing. The dispersion can itself be coated or enrobed in chocolate or other food coating. Techniques of filling, coating and/or enrobing are described in B. W. Minifie, *Chocolate, Cocoa and Confectionery: Science and Technology,* pp. 128–138, 142–179, and 401–414 (AVI Publ. Co., Westport, Conn., 1980, 2d ed.).

After incorporation, the comestible article will be stored for a limited time to allow completion of crystallization to the extent desired. The time required for completion of crystallization will depend upon the particular formulation chosen, but will generally be from about 10 minutes to about 24 hours. The temperature of the mixture during the crystallization period may vary, but will generally be close to ambient temperature to allow crystallization to proceed to the desired degree. In confections at high dry solids and with moderate dextrose levels, it may be desirable to heat seeded mixture to obtain the desired crystallization.

The following examples will illustrate the invention, but should not be construed to limit the invention unless otherwise expressly noted. Those skilled in the art will understand that variations of the same may be made within the scope and spirit of the invention. In this specification and claims, all parts, percentages, ratios and the like are by weight unless otherwise indicated in context.

EXAMPLES

EXAMPLE 1

Mint Nougat

| Ingredients | Percent |
|---|---|
| Bob Syrup | |
| ISOSWEET ® 180 high fructose corn syrup (42% fructose, d.s.b. and 80% d.s., A. E. Staley Manufacturing Company) | 66.10 |
| STALEYDEX ® 333 crystalline dextrose (A. E. Staley Manufacturing Company) | 19.20 |
| KRYSTAR 300 crystalline fructose | 12.80 |
| SOFT-SET corn starch | 1.90 |
| | 100.00 |
| Nougat | |
| Bob syrup | 79.81 |
| ISOSWEET 180 high fructose corn syrup | 7.80 |
| KAOMEL ® partially hydrogenated vegetable shortening (Van den Bergh Foods) | 5.20 |
| Water | 2.80 |
| STALEYDEX ® 111 crystalline dextrose (A. E. Staley Manufacturing Company) | 2.60 |
| VERSA-WHIP 500 vegetable protein | 1.30 |
| Color (1% solution W. J. 06515) | .45 |
| Flavor (Flavors of N. America #877.010/WN) | .04 |
| | 100.00 |

Procedure

1. Cook bob syrup ingredients in steam jacketed kettle to 200° F. Remove from kettle.
2. Blend the VERSA-WHIP 500 in with the ISOSWEET 180, add the water and stir in well. Pour into large bowl of Hobart mixer.
3. Add bob syrup on top of VERSA-WHIP 500/ISOSWEET 180/water mixture and whip with wire whip on speed 3 for 1 minute. Take density.
4. Replace wire whip with paddle blade. Add color and flavor. Mix well on speed 1.
5. Slowly add melted KAOMEL in a steady stream. Mix well. Scrape bowl thoroughly.
6. Add STALEYDEX 111 (the seed) and mix well. Scrape bowl. Mix about 15–20 seconds more. Remove from mixer.
7. Take final density. Target density is 0.7–0.75.
8. Let nougat cool to 90° F. Deposit into chocolate shells.

EXAMPLE 2

Shell Nougat from Dry Sweeteners

| Ingredients | Parts by Weight |
|---|---|
| Bob Syrup | |
| KRYSTAR 300 crystalline fructose | 1,680 |
| STALEYDEX 333 crystalline dextrose | 2,432 |
| SOFT-SET corn starch | 45 |
| Water | 483 |
| Whipping Solution | |
| KRYSTAR 300 crystalline fructose | 150 |
| VERSA-WHIP 500 vegetable protein | 47 |
| Water (at 130° F.) | 137 |
| After-Whip | |
| Cocoa | 94 |
| KAOMEL shortening | 377 |
| STALEYDEX 111 crystalline dextrose | 94 |

Procedure

Bob Syrup

1. Add water and 1,080 parts by weight of KRYSTAR 300 to kettle and mix well (no heat).
2. Then add STALEYDEX 333. Mix in well and scrape down any hang-ups on the stirrer blades.
3. Add SOFT-SET starch and stir into cold syrup.
4. Heat the above to 185° F., then discontinue heat.
5. Add the remaining KRYSTAR and stir in.

Whipping Solution

1. Add KRYSTAR 300 to 37 parts by weight water and stir in.
2. Add protein and stir into smooth concentrate.
3. Add 100 parts by weight hot water and stir into smooth dilution.

Nougat

1. Combine 2,717 parts by weight of hot bob syrup with 344 parts by weight of protein solution.
2. Using a 20 qt. bowl of Hobart mixer and paddle beater, whip on speed 2 for 4 minutes, then go to speed 3 for about 1 minute to density of 0.5–0.55.

After-Whip Components

1. Add cocoa powder and mix in for about 1 minute, scrape bowl to complete mixing.
2. Add shortening and mix in uniformly, about 1 minute.
3. Add seed dextrose and complete mixing.
4. Final density target is 0.55–0.6.
5. Pump and fill shells at 80°–90° F.

EXAMPLE 3

Shell Deposited Raspberry Nougat

| Ingredients | Percent |
|---|---|
| Part I (Bob Syrup) | |
| ISOSWEET 180 high fructose corn syrup | 50.00 |
| STALEYDEX 333 crystalline dextrose | 25.00 |
| KRYSTAR 300 crystalline fructose | 25.00 |
| | 100.00 |
| Part II (Whipping Concentrate) | |
| ISOSWEET 180 high fructose corn syrup | 80.00 |
| VERSA-WHIP 500 vegetable protein | 20.00 |
| | 100.00 |
| Part III (Nougat) | |
| Part I (bob syrup) | 80.50 |
| Part II (whipping concentrate) | 6.50 |
| KAOMEL shortening | 7.50 |
| STALEYDEX 111 crystalline dextrose | 2.60 |
| Red raspberry juice concentrate (68° Brix, Sanofi Bio-Industries) | 2.00 |
| Natural raspberry flavor (WONF #11783, California Brands Flavors) | .90 |
| | 100.00 |

Procedure

1. Heat part I 200° F. to dissolve sweeteners.
2. In part II, blend the VERSA-WHIP 500 in with ISOSWEET 180 until it is a smooth dispersion. Place in bowl of Hobart mixer.
3. Weigh part 1 on top of part II in bowl and whip for 1½ minutes with a wire whip on speed 3. Target density is 0.7–0.75.
4. Add the red raspberry juice concentrate and raspberry flavor. Mix in well on speed 1.

5. Add the melted KAOMEL in a slow steady stream while mixing on speed 1.

6. Add the STALEYDEX 111 and mix in well on speed 1. Scrape down bowl and complete mixing until product looks uniform.

7. Remove from mixer. Let cool to 90° F. and fill into hollow chocolate shells.

EXAMPLE 4

Biscuit Cookie Raspberry Nougat

| Ingredients | Percent |
|---|---|
| Part I (Bob Syrup) | |
| ISOSWEET 180 high fructose corn syrup | 50.00 |
| STALEYDEX 333 crystalline dextrose | 25.00 |
| KRYSTAR 300 crystalline fructose | 25.00 |
| | 100.00 |
| Part II (Whipping Concentrate) | |
| ISOSWEET 180 high fructose corn syrup | 80.00 |
| VERSA-WHIP 500 vegetable protein | 20.00 |
| | 100.00 |
| Part III (Nougat) | |
| Part I (bob syrup) | 80.50 |
| Part II (whipping concentrate) | 6.50 |
| KAOMEL shortening | 7.50 |
| STALEYDEX 111 crystalline dextrose | 2.60 |
| Red raspberry juice concentrate (68° Brix, Sanofi Bio-Industries) | 2.00 |
| Natural raspberry flavor (WONF #11783, California Brands Flavors) | .90 |
| | 100.00 |

Procedure

1. Heat part I to 200° F. to dissolve sweeteners.

2. In part II, blend the VERSA-WHIP 500 in with ISOSWEET 180 until it is a smooth dispersion. Place in bowl of Hobart mixer.

3. Weigh part I on top of part II in bowl and whip for 2 minutes with a wire whip on speed 3. Target density is 0.55–0.6.

4. Add the red raspberry juice concentrate and raspberry flavor. Mix in well on speed 1.

5. Add the melted KAOMEL in a slow steady stream while mixing on speed 1.

6. Add the STALEYDEX 111 and mix in well on speed 1. Scrape down bowl and complete mixing until product looks uniform.

7. Fill pastry bag and top cookie bases with the fresh nougat.

8. Enrobe with chocolate or confectioner's coating.

EXAMPLE 5

Biscuit Cookie Chocolate Nougat

| Ingredients | Percent |
|---|---|
| Bob Syrup | |
| ISOSWEET 180 high fructose corn syrup | 58.00 |
| STALEYDEX 333 crystalline dextrose | 20.00 |
| KRYSTAR 300 crystalline fructose | 22.00 |
| | 100.00 |
| Nougat | |
| Bob syrup | 76.00 |
| KAOMEL shortening | 7.50 |
| ISOSWEET 180 high fructose corn syrup | 5.20 |
| STALEYDEX 111 crystalline dextrose | 2.60 |
| Coca | 2.60 |
| Butter (unsalted) | 2.50 |
| Molasses | 2.00 |
| VERSA-WHIP 500 vegetable protein | 1.30 |

-continued

| Ingredients | Percent |
|---|---|
| Vanilla flavor | .30 |
| | 100.00 |

Procedure

1. Cook bob syrup ingredients in steam jacked kettle to 200° F. to dissolve sweeteners.

2. Blend VERSA-WHIP 500 with ISOSWEET 180 (5.20%) and put into large bowl of Hobart mixer.

3. Weigh bob syrup on top of VERSA-WHIP 500/ISOSWEET 180 blend. Whip with wire whip on speed 3 for 2 minutes. Target density is 0.55–0.6.

4. Add cocoa, vanilla and molasses. Mix in well. Scrape bowl.

5. Add melted fat (shortening and butter) in a slow steady stream. Mix in well. Scrape bowl.

6. Add STALEYDEX 111. Mix in well. Scrape bowl.

7. Remove from mixer. Deposit onto cookie wafer.

EXAMPLE 6

Shell Deposited Mint Nougat

| Ingredients | Percent |
|---|---|
| Bob Syrup | |
| ISOSWEET 180 high fructose corn syrup | 50.00 |
| STALEYDEX 333 crystalline dextrose | 25.00 |
| KRYSTAR 300 crystalline fructose | 25.00 |
| | 100.00 |
| Nougat | |
| Bob syrup | 80.30 |
| KAOMEL shortening | 7.50 |
| ISOSWEET 180 high fructose corn syrup | 7.80 |
| STALEYDEX 111 crystalline dextrose | 2.60 |
| VERSA-WHIP 500 vegetable protein | 1.30 |
| Mint green color | .46 |
| Natural and artificial mint flavor | .04 |
| | 100.00 |

Procedure

1. Cook bob syrup ingredients in steam jacketed kettle to 200° F. to dissolve sweeteners.

2. Blend the VERSA-WHIP 500 in with the ISOSWEET 180 for the nougat. Put into large bowl of Hobart mixer.

3. Weigh bob syrup on top of VERSA-WHIP 500/ISOSWEET 180 blend. Whip with wire whip on speed 3 for 80 seconds. Target density is 0.7–0.75.

4. Blend in flavor and color on speed 1 until mixed in.

5. Slowly add melted fat in a steady stream. Mix in well. Scrape bowl.

6. Add STALEYDEX 111 and mix in well. Scrape bowl.

7. Remove from mixer. Let cool to 90° F. and fill into hollow chocolate shells.

EXAMPLE 7

Shell Deposited Chocolate Nougat

| Ingredients | Percent |
|---|---|
| Bob Syrup | |
| ISOSWEET 180 high fructose corn syrup | 58.00 |
| STALEYDEX 333 crystalline dextrose | 20.00 |

-continued

| Ingredients | Percent |
|---|---|
| KRYSTAR 300 crystalline fructose | 22.00 |
| | 100.00 |
| Nougat | |
| Bob syrup | 76.00 |
| KAOMEL shortening | 7.50 |
| ISOSWEET 180 high fructose corn syrup | 5.20 |
| STALEYDEX 111 crystalline dextrose | 2.60 |
| Coca | 2.60 |
| Butter (unsalted) | 2.50 |
| Molasses | 2.00 |
| VERSA-WHIP 500 vegetable protein | 1.30 |
| Vanilla flavor | .30 |
| | 100.00 |

Procedure

1. Cook bob syrup in steam jacketed kettle to 200° F. to dissolve sweeteners.
2. Blend VERSA-WHIP 500 with ISOSWEET 180 for the nougat and put into large bowl of Hobart mixer.
3. Weigh bob syrup on top of VERSA-WHIP 500/ISOSWEET 180 blend. Whip with wire whip on speed 3 for 80 seconds. Target density is 0.7–0.75.
4. Add cocoa, vanilla and molasses. Mix in well. Scrape bowl.
5. Add melted fat (shortening and butter) in a slow steady stream. Mix in well. Scrape bowl.
6. Add STALEYDEX 111. Mix in well. Scrape bowl.
7. Remove from mixer. Let cool to 90° F. and fill into hollow chocolate shells.

EXAMPLE 8

Slab Short Nougat

| Ingredients | Amount |
|---|---|
| Bob Syrup | |
| SWEETOSE 43 corn syrup | 1000 gm |
| STALEYDEX 333 crystalline dextrose | 1600 gm |
| KRYSTAR 300 crystalline fructose | 800 gm |
| Water | 200 gm |
| Whipping Mixture | |
| 200° F. bob syrup | 2000 gm |
| Banana puree @ 42° Brix | 200 gm |
| VERSA-WHIP 500 vegetable protein | 30 gm |
| After-Whip Addition | |
| Banana flavor (natural, WONF #9/70A522, Dragoco, Inc.) | 2 ml |
| Yellow #5 (10% solution) artificial color | 3 ml |
| Citric acid, fine crystals | 5 gm |
| STALEYDEX 111 (seed) dextrose | 60 gm |
| KAOMEL shortening (melted @ 110° F.) | 60 gm |

Procedure

1. Heat ingredients for bob syrup to 260° F.–270° F. and then cool to 200° F.
2. Mix banana puree and VERSA-WHIP 500 protein to a smooth concentrate and add to hot bob syrup in 11 quart bowl of Hobart mixer.
3. Immediately whip for 3 minutes, using Hobart speed 3 and wire beater. Final density will be about 0.55.
4. Add after-whip ingredients in order listed with stirring on speed 1.
5. Lightly spray plastic sheeting with PAM cooking spray, pour mixture and size down to thickness between the plastic film and freeze for about 10 minutes (center temperature approximately 85° F.). Then cut into desired pieces, e.g. with circular knife.

EXAMPLE 9

Starch Cast Panning Centers

| Ingredients | Amount |
|---|---|
| Bob Syrup | |
| SWEETOSE 43 corn syrup | 1000 gm |
| STALEYDEX 333 crystalline dextrose | 2200 gm |
| KRYSTAR 300 crystalline fructose | 400 gm |
| Whipping Mixture | |
| 250° F. bob syrup | 2000 gm |
| ISOSWEET 180 high fructose syrup | 100 gm |
| VERSA-WHIP 500 vegetable protein | 30 gm |
| After-Whip Addition | |
| Red #40 (10% soln.) artificial color | 10 ml |
| Citric acid, fine crystals | 15 gm |
| Strawberry flavor (Natural Type #9/70G199, Dragoco, Inc.) | 25 ml |
| STALEYDEX 111 (seed) dextrose | 60 gm |

Procedure

1. Heat ingredients of bob syrup to 260° F.
2. Place hot bob syrup in 11 quart mixing bowl of Hobart mixer.
3. Mix ISOSWEET 180 and VERSA-WHIP 500 into smooth concentrate and add to hot bob syrup.
4. Immediately whip for 1½ minutes, using Hobart speed 3 and wipe beater. Final density will be about 0.8.
5. Add after-whip ingredients in order listed with stirring at speed 1.
6. Deposit in dry, warm moulding starch. Hold hopper temperature at 200° F. Hold overnight (heat at 120°–130° F. hot room temperature if desired). Shake out, allow to cool, and pan with chocolate.

What is claimed is:

1. A method of preparing a dextrose gained nougat confection comprising:

preparing a mixture comprised of a major amount of a sweetener syrup and a minor amount of a proteinaceous whipping agent, said sweetener syrup comprising dextrose and fructose and being supersaturated with respect to dextrose, but containing sufficient water to dissolve said whipping agent;

aerating the sweetener syrup of said mixture to disperse therein a discontinuous gas phase contained within a continuous aqueous liquid phase;

mixing said aerated sweetener syrup with a minor amount of a fat component to disperse said fat component therein;

seeding said aerated mixture of fat component and sweetener syrup with dextrose seed crystals and allowing dextrose to crystallize from said sweetener syrup onto said dextrose seed crystals to produce a dispersion of dextrose microcrystals dispersed in said aqueous liquid phase of said syrup;

incorporating said mixture after said aerating and seeding into a comestible article and storing said comestible article, wherein the amount of fructose in said sweetener syrup is insufficient to prohibit the formation of said microcrystals of dextrose, but is sufficient to maintain the stability of said aqueous liquid phase during said storing.

* * * * *